(12) United States Patent
Wang et al.

(10) Patent No.: US 7,273,899 B2
(45) Date of Patent: Sep. 25, 2007

(54) MATERIALS AND METHOD FOR MAKING SPLAYED LAYERED MATERIALS

(75) Inventors: Jin-Shan Wang, Pittsford, NY (US);
Xiaoru Wang, Webster, NY (US);
Samuel Chen, Penfield, NY (US);
Thomas N. Blanton, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 182 days.

(21) Appl. No.: 10/254,352

(22) Filed: Sep. 25, 2002

(65) Prior Publication Data

US 2004/0059037 A1 Mar. 25, 2004

(51) Int. Cl.
*C08J 3/12* (2006.01)
*C08K 9/04* (2006.01)
*C08K 3/34* (2006.01)
*C04B 33/04* (2006.01)

(52) U.S. Cl. .................... 523/342; 523/216; 524/445; 524/447; 501/145; 501/148

(58) Field of Classification Search ............... 524/445, 524/447, 186; 501/145, 147, 148; 523/216, 523/342
See application file for complete search history.

(56) References Cited

U.S. PATENT DOCUMENTS

| | | | |
|---|---|---|---|
| 4,739,007 A | 4/1988 | Okada et al. | |
| 4,810,734 A | 3/1989 | Kawasumi et al. | |
| 4,894,411 A | 1/1990 | Okada et al. | |
| 5,102,948 A | 4/1992 | Deguchi et al. | |
| 5,164,440 A | 11/1992 | Deguchi et al. | |
| 5,164,460 A | 11/1992 | Yano et al. | |
| 5,248,720 A | 9/1993 | Deguchi et al. | |
| 5,804,613 A | 9/1998 | Beal et al. | |
| 5,854,326 A | 12/1998 | Sakaya et al. | |
| 5,880,197 A | 3/1999 | Beal et al. | |
| 5,883,173 A | 3/1999 | Elspass et al. | |
| 6,034,163 A | 3/2000 | Barbee et al. | |
| 6,306,995 B1 | 10/2001 | Wang | |
| 6,310,165 B1 | 10/2001 | Wang | |
| 6,545,084 B2* | 4/2003 | Brown et al. | 524/556 |
| 6,579,463 B1* | 6/2003 | Winningham et al. | 216/41 |
| 6,765,049 B2* | 7/2004 | Lorah et al. | 524/445 |
| 6,838,507 B2* | 1/2005 | Chou et al. | 524/445 |
| 2002/0055580 A1* | 5/2002 | Lorah et al. | 524/445 |
| 2002/0055581 A1* | 5/2002 | Lorah et al. | 524/445 |
| 2002/0058739 A1* | 5/2002 | Lorah et al. | 524/445 |
| 2002/0058740 A1* | 5/2002 | Lorah et al. | 524/445 |
| 2002/0086908 A1* | 7/2002 | Chou et al. | 516/98 |
| 2006/0293430 A1* | 12/2006 | Wang et al. | 524/445 |

FOREIGN PATENT DOCUMENTS

| | | |
|---|---|---|
| EP | 0 791 556 | 8/1997 |
| WO | 97 00910 | 1/1997 |

OTHER PUBLICATIONS

Marc W. Weimer, Hua Chen, Emmanuel P. Giannelis, and Dotsevi Y. Sogah, *Direct Synthesis of Dispersed Nanocomposites by a Situ Living Free Radical Polymerization Using a Silicate-Anchored Initiator*, J. Am. Chem. Soc., 1999, 121, pp. 1615-1616.
Akane Okada et al., *Polymer Prep.*, vol. 28, 1987, pp. 447-448.
Rachel Levy et al., *Interlayer Adsorption of Polyvinylpyrrolidone on Montmorillonite*, Journal of Colloid and Interface Science, vol. 50(3), 1975, pp. 442-450.
D. J. Greenland, *Adsorption of Polyvinyl Alcohols by Montmorillonite*, Journal of Colloid Science, vol. 18, 1963, pp. 647-664.
Richard A. Vaia, *New Polymer Electrolyte Nanocomposites: Melt Intercalation of Polyethyleneoxide in Mica Type Silicates*, Advanced Materials, 7(2), 1995, pp. 154-156.
Vivek Mehrotra and Emmanuel P. Giannelis, *Metal-Insulator Molecular Multilayers of Electroactive Polymers: Intercalation of Polyaniline in Mica-Type Layered Silicates*, Solid State Communications, vol. 77, No. 2, 1991, pp. 155-158.
Edited by T. J. Pinnavaia and G. W. Beall, *Polymer-Clay Nanocomposites*, John Wiley & Sons, Ltd. Publishers, 2000.

* cited by examiner

*Primary Examiner*—Tae H Yoon
(74) *Attorney, Agent, or Firm*—Lynne M Blank

(57) ABSTRACT

The present invention relates to a splayed material comprising a layered material splayed with a particle having a diameter equal to or less than 3 micrometers. Another embodiment of the invention includes an article comprising a matrix and a layered material splayed with a polymeric particles dispersed in a medium. The invention also relates to methods for preparing these materials via mixing, milling and emulsifying a solvent borne polymer with a surfactant. A further method describes a method for preparing a nanocomposite from a splayant particle prepared by combining an emulsion polymerization monomer and a surfactant dispersible in a medium wherein the monomer is not dispersible in the medium.

25 Claims, 3 Drawing Sheets

MATERIALS AND METHOD FOR MAKING SPLAYED LAYERED MATERIALS

FIELD OF THE INVENTION

The present invention relates to the use of polymeric particles having a diameter of 3 micrometers or less to splay layered materials.

BACKGROUND OF THE INVENTION

Over the last decade or so, the utility of inorganic nanoparticles as additives to enhance polymer performance has been well established. Ever since the seminal work conducted at Toyota Central Research Laboratories, polymer-clay nanocomposites have generated a lot of interest across various industries. The unique physical properties of these nanocomposites have been explored by such varied industrial sectors as the automotive industry, the packaging industry, and plastics manufactures. These properties include improved mechanical properties, such as elastic modulus and tensile strength, thermal properties such as coefficient of linear thermal expansion and heat distortion temperature, barrier properties, such as oxygen and water vapor transmission rate, flammability resistance, ablation performance, solvent uptake, and the like. Some of the related prior art is illustrated in U.S. Pat. Nos. 4,739,007, 4,810,734, 4,894,411, 5,102,948, 5,164,440, 5,164,460, 5,248,720, 5,854,326, and 6,034,163.

In general, the physical property enhancements for these nanocomposites are achieved with less than 20 vol. % addition, and usually less than 10 vol. % addition of the inorganic phase, which is typically clay or organically modified clay. Although these enhancements appear to be a general phenomenon related to the nanoscale dispersion of the inorganic phase, the degree of property enhancement is not universal for all polymers. It has been postulated that the property enhancement is very much dependent on the morphology and degree of dispersion of the inorganic phase in the polymeric matrix.

The clays in the polymer-clay nanocomposites are ideally thought to have three structures: (1) clay tactoids wherein the clay particles are in face-to-face aggregation with no organics inserted within the clay lattice, (2) intercalated clay wherein the clay lattice has been expanded to a thermodynamically defined equilibrium spacing due to the insertion of individual polymer chains, yet maintaining a long range order in the lattice, and (3) exfoliated clay wherein singular clay platelets are randomly suspended in the polymer, resulting from extensive penetration of the polymer into the clay lattice and its subsequent delamination. The greatest property enhancements of the polymer-clay nanocomposites are expected with the latter two structures mentioned herein above.

There has been considerable effort towards developing materials and methods for intercalation and/or exfoliation of clays and other layered inorganic materials. In addition to intercalation and/or exfoliation, the clay phase should also be rendered compatible with the polymer matrix in which they are distributed. The challenge in achieving these objectives arises from the fact that unmodified clay surfaces are hydrophilic, whereas vast number of thermoplastic polymers of technological importance are hydrophobic in nature. Although intercalation of clay with organic molecules may be obtained by various means, compatibilizing these intercalated clays in a polymer matrix for uniform distribution still poses considerable difficulty. In the industry, the clay suppliers normally provide just the intercalated clays and the end-users are challenged to select materials and processes for compatibilizing these clays in the thermoplastics of their choice. This selection process involves trial and error at a considerable development cost to the end-users. Since clay intercalation and compatibilization in the matrix polymer usually involve at least two distinct materials, processes, and sites, the overall cost of the product comprising the polymer-clay nanocomposite suffers.

A vast majority of intercalated clays are produced by interacting anionic clays with cationic surfactants including onium species such as ammonium (primary, secondary, tertiary, and quaternary), phosphonium, or sulfonium derivatives of aliphatic, aromatic or arylaliphatic amines, phosphines and sulfides. These onium ions may cause intercalation in the clay through ion exchange with the metal cations present in the clay lattice for charge balance. However, these surfactant molecules may degrade during subsequent melt-processing, placing severe limitation on the processing temperature and the choice of the matrix polymer. Moreover, the surfactant intercalation is usually carried out in the presence of water, which needs to be removed by a subsequent drying step.

Intercalation of clay with a polymer, as opposed to a low molecular weight surfactant, is also known in the art. There are two major intercalation approaches that are generally used—intercalation of a suitable monomer followed by polymerization (known as in-situ polymerization, see A. Okada et. al., *Polym Prep.*, Vol. 28, 447, 1987) or monomer/polymer intercalation from solution. Polyvinyl alcohol (PVA), polyvinyl pyrrolidone (PVP) and polyethylene oxide (PEO) have been used to intercalate the clay platelets with marginal success. As described by Levy et.al, in "Interlayer adsorption of polyvinylpyrrolidone on montmorillonite", *Journal of Colloid and Interface Science*, Vol 50 (3), 442, 1975, attempts were made to sorb PVP between the monoionic montmorillonite clay platelets by successive washes with absolute ethanol, and then attempting to sorb the PVP by contacting it with 1% PVP/ethanol/water solutions, with varying amounts of water. Only the Na-montmorillonite expanded beyond 20 Å basal spacing, after contacting with PVP/ethanol/water solution. The work by Greenland, "Adsorption of polyvinyl alcohol by montmorillonite", *Journal of Colloid Science*, Vol. 18, 647-664 (1963) discloses that sorption of PVA on the montmorillonite was dependent on the concentration of PVA in the solution. It was found that sorption was effective only at polymer concentrations of the order of 1% by weight of the polymer. No further effort was made towards commercialization since it would be limited by the drying of the dilute intercalated layered materials. In a recent work by Richard Vaia et.al., "New Polymer Electrolyte Nanocomposites: Melt intercalation of polyethyleneoxide in mica type silicates", *Adv. Materials*, 7(2), 154-156, 1995, PEO was intercalated into Na-montmorillonite and Li-montmorillonite by heating to 80° C. for 2-6 hours to achieve a d-spacing of 17.7. The extent of intercalation observed was identical to that obtained from solution (V. Mehrotra, E. P. Giannelis, *Solid State Commun.*, 77, 155, 1991). Other, recent work (U.S. Pat. No. 5,804,613) has dealt with sorption of monomeric organic compound having at least one carbonyl functionality selected from a group consisting of carboxylic acids and salts thereof, polycarboxylic acids and salts thereof, aldehydes, ketones and mixtures thereof. Similarly U.S. Pat. No. 5,880,197 discusses the use of an intercalating monomer that contains an amine or amide functionality or mixtures thereof. In both these patents, and other patents issued to the same group, the intercalation is performed at very dilute clay concentrations in a medium such as water, leading to a necessary and costly drying step, prior to melt-processing.

In order to further facilitate delamination and prevent reaggregation of the clay particles, these intercalated clays are required to be compatible with the matrix polymer in which they are to be incorporated. This may be achieved through the careful selection and incorporation of compatibilizing or coupling agents, which consist of a portion which bonds to the surface of the clay and another portion which bonds or interacts favorably with the matrix polymer. Compatibility between the matrix polymer and the clay particles ensures a favorable interaction, which promotes the dispersion of the intercalated clay in the matrix polymer. Effective compatibilization leads to a homogenous dispersion of the clay particles in the typically hydrophobic matrix polymer and/or an improved percentage of exfoliated or delaminated clay. Typical agents known in the art include general classes of materials such as organosilane, organozirconate and organotitanate coupling agents. However, the choice of the compatibilizing agent is very much dependent on the matrix polymer as well as the specific component used to intercalate the clay, since the compatibilizer has to act as a link between the two.

A survey of the art, makes it clear that there is a lack of general guideline for the selection of the intercalating and compatibilizing agents for a specific matrix polymer and clay combination. Even if one can identify these two necessary components through trial and error, they are usually incorporated as two separate entities, usually in the presence of water followed by drying, in a batch process and finally combined at a separate site with the matrix polymer during melt-processing of the nanocomposite. Such a complex process obviously adds to the cost of development and manufacturing of the final product comprising such a nanocomposite. There is a critical need in the art for a comprehensive strategy for the development of better materials and processes to overcome some of the aforementioned drawbacks.

Imaging elements such as photographic elements usually comprise a flexible thermoplastic base on which is coated the imaging material such as the photosensitive material. The thermoplastic base is usually made of polymers derived from the polyester family such as polyethylene terephthalate (PET), polyethylene naphthalate (PEN) and cellulose triacetate (TAC). Films for color, black and white photography, and motion picture print film are examples of imaging media comprising such flexible plastic bases in roll form. TAC has attributes of high transparency and curl resistance after processing but poor mechanical strength. PET on the other hand has excellent mechanical strength and manufacturability but undesirable post-process curl. The two former attributes make PET more amenable to film thinning, enabling the ability to have more frames for the same length of film. Thinning of the film however causes loss in mechanical strength. The stiffness will drop as approximately the cube root of the thickness of the film. Also a photosensitive material coated on the base in a hydrophilic gelatin vehicle will shrink and curl towards the emulsion when dry. There is a need for a base that is thinner yet stiff enough to resist this stress due to contraction forces. Films may also be subjected to excursions to high temperatures during use. Hence, a transparent film base that has dimensional stability at high temperatures due to its higher heat capacity is also highly desirable. For many coating applications, micro-particles or nano-particles of polymers are used. However, the mechanical strength of these polymer materials is sometimes less than desired.

There is a need to provide an imaging element with a flexible thermoplastic base having improved mechanical strength and other physical properties.

SUMMARY OF THE INVENTION

The present invention relates to a splayed material comprising a layered material splayed with a particle having a diameter equal to or less than 3 micrometers. Another embodiment of the invention includes an article comprising a matrix and a layered material splayed with a polymeric particles dispersed in a medium. A further embodiment includes a method for preparing a nanocomposite comprising the steps of preparing a particle, mixing a particle with a layered material dispersed in a medium, and splaying a layered material to produce a nanocomposite, wherein the particle comprises a diameter equal to or less than 3 micrometers. The present invention also comprises another method for preparing a nanocomposite comprising the steps of preparing a particle by combining an emulsion polymerization monomer and a surfactant dispersible in a medium wherein the monomer is not dispersible in the medium, mixing the particle with a layered material dispersed in the medium, and splaying the layered material to produce a nanocomposite, wherein the particle comprises a diameter equal to or less than 3 micrometers. Another method for preparing a nanocomposite comprises the steps of milling in a medium a polymer and surfactant dispersible in the medium, wherein the polymer is not dispersible in the medium, to form a particle dispersed in the medium, mixing the particle with a layered material dispersible in the medium, and splaying the layered material to produce a nanocomposite, wherein the particle comprises a diameter equal to or less than 3 micrometers. In addition, another method for preparing a nanocomposite comprises the steps of emulsifying a solvent borne polymer with a surfactant in a medium in which the polymer is not dispersible and removing the solvent to form a particle, mixing the particle with a layered material dispersible in the medium, and splaying the layered material to produce a nanocomposite, wherein the particle comprises a diameter equal to or less than 3 micrometers.

The invention has numerous advantages, not all of which are incorporated into one single embodiment. Nano-composites comprising a polymer matrix and a layered material using micro-particles or nano-particles may be aqueous, environmentally friendly system and may be used without any further treatment in most applications. The nano-composite above may also be easily transformed into solids by drying, heating, or adding salt. Another advantage of using micro-particles or nano-particles is the ease of manufacture, without melting, or the use of special instruments.

The present invention advantageously may provide a universal method to manufacture nano-composites of a polymer matrix and a layered material. Specifically, this invention may provide a method to manufacture nano-composite comprising a polymer matrix and a layered material by mixing micro- or nano-particle and the layered material in solution. Moreover, this invention may provide a layered material splayed by micro- or nano-particles. This invention may also provide a nano-composite comprising the layered material splayed by micro- or nano-particle and a polymer matrix or a splayed material, which may be effectively incorporated into a polymer-layered material nanocomposite. Such polymer particle-layered material nanocomposites may be incorporated into an article of engineering application with improved physical properties such as modulus, tensile strength, toughness, impact resistance, electrical conductivity, heat distortion temperature, coefficient of linear thermal expansion, fire retardance, oxygen and water vapor barrier properties, and the like. The application of such articles in a number of industrial sectors, such as automotive, packaging, battery, cosmetics, aerospace, and the like have been elucidated in the literature, for example, "Polymer-Clay Nanocomposites," Ed. T. J. Pinnavia and G. W. Beall, John Wiley & Sons, Ltd. Publishers.

Some embodiments of the present invention may have an additional advantage of intercalating/exfoliating the layered materials with a micro- or nano-particle wherein the bridging of the matrix polymer and layered materials may be readily achieved. The final product may be a nano-composite comprising spherical polymeric particles and layered material or a nano-composite comprising extended polymer chain particles and layered material. The particles may contain water soluble or oil soluble polymers stabilized by either water soluble or oils soluble surfactant. These particles have the ability to readily enter the layered material lattice and splay the layered materials. The aforesaid micro- or nano- particles may further comprise a structural unit compatible with another host polymer, to which the splayed material is added. A functional surfactant stabilized particles may ensure that a component of the particle will intercalate/exfoliate the layered material and another component or attached functional groups will physically or chemically compatibilize the splayed layered materials with a matrix polymer. Thus, two necessary criteria of effectively dispersing layered materials in a particle to form a desirable polymer-layered material nanocomposite, namely layered material intercalation/exfoliation and compatibilization, may be fulfilled by the choice of the functional surfactant in particle of this invention.

Another advantage of some of the embodiments of the invention derives from the fact that the layered material, the particle and the matrix polymer may all be combined in a single step in a suitable solution, thus, adding greatly to the efficiency of the manufacturing process.

Additionally, the present invention teaches a general strategy wherein the chemistry of the particle may be tailored according to the choice of the layered material and the specific matrix polymer. The particle size may be controlled easily to meet the processing conditions, such as temperature, shear, viscosity and product needs, such as various physical properties.

DETAILED DESCRIPTION OF THE INVENTION

Figure 1:
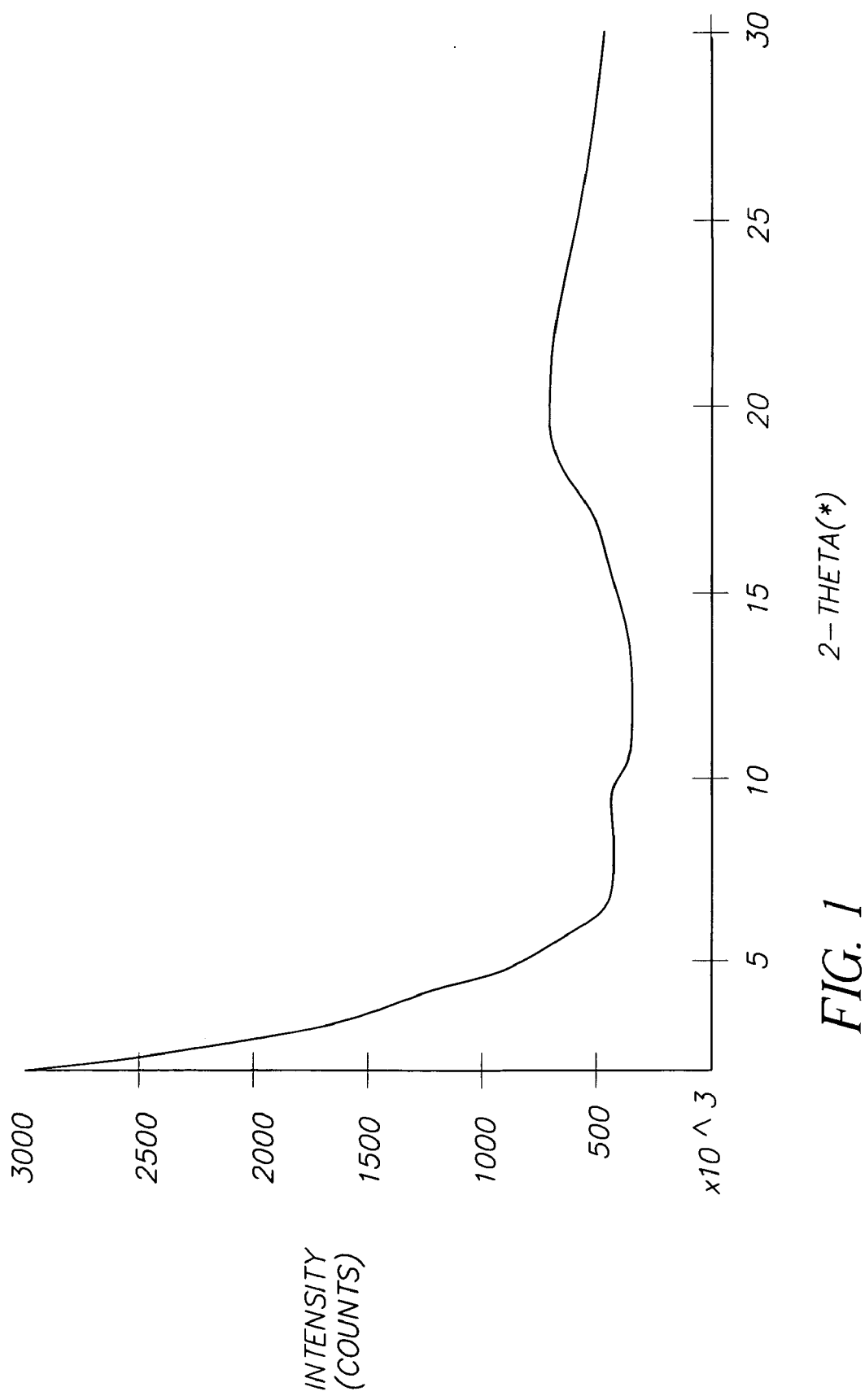
FIG. 1. illustrates an XRD pattern for P4:L2 at a ratio of 95:5, as in Example 8.

Whenever used in the specification the terms set forth shall have the following meaning:

"Nanocomposite" shall mean a composite material wherein at least one component comprises an inorganic phase, such as a smectite layered material, with at least one dimension in the 0.1 to 100 nanometer range.

"Plates" shall mean particles with two comparable dimensions significantly greater than the third dimension, e.g., length and width of the particle being of comparable size but orders of magnitude greater than the thickness of the particle.

"Layered material" shall mean an inorganic material such as a smectite layered material that is in the form of a plurality of adjacent bound layers.

"Platelets" shall mean individual layers of the layered material.

"Intercalation" shall mean the insertion of one or more foreign molecules or parts of foreign molecules between platelets of the layered material, usually detected by X-ray diffraction technique, as illustrated in U.S. Pat. No. 5,891,611 (line 10, col.5-line 23, col. 7).

"Intercalant" shall mean the aforesaid foreign molecule inserted between platelets of the aforesaid layered material.

"Intercalated" shall refer to layered material that has at least partially undergone intercalation and/or exfoliation.

"Exfoliation" or "delamination" shall mean separation of individual platelets in to a disordered structure, without any stacking order.

"Organo layered material" shall mean layered material modified by organic molecules.

"Splayed" layered materials are defined as layered materials which are completely intercalated with no degree of exfoliation, totally exfoliated materials with no degree of intercalation, as well as layered materials which are both intercalated and exfoliated including disordered layered materials.

"Splaying" refers to the separation of the layers of the layered material, which may be to a degree which still maintains a lattice-type arrangement, as in intercalation, or to a degree which spreads the lattice structure to the point of loss of lattice structure, as in exfoliation.

"Splayant" refers to the material, such as a polymeric particle, used to splay the layered material.

The splayed material made in the present invention may comprise layered material splayed with a particle, referred to also herein as a splayant, which has a diameter equal to or less than 3 micrometers. In a preferred embodiment of the invention, the particle is a polymeric particle with a size of from about 5 nm to about 100 μm, preferably from 10 nm to 2 μm. In preferred embodiments, the polymeric splayant material may be a microparticle or a nanoparticle. For purposes of the present invention, a microparticle is a polymeric particle with a diameter of between 0.5 and 3 micrometers. For purposes of the present invention, a nanoparticle is a polymeric particle with a diameter of less than 0.5 micrometers. The splayant particle may be a nonporous or a porous particle. The particles may be in any form, shape or combination of forms and shapes, which include porous micro- or nanoparticles and core-shell particles. The resulting splayed layered material may form a nanocomposite, which may be used alone or as a master batch to mix with additional polymer matrix to form new nanocomposite materials.

It is further noted that splayed or layered material may interact with the particles, particularly polymer particles, in a specific way. The polymer itself may take on a spherical, bead-like morphology, with diameters ranging from ~30-80 nm. The splayed or layered platelets of layered material may be found to adhere either on the polymer particle, also referred to as bead, surfaces, or be sandwiched between beads with the long-direction of the splayed or layered platelets tangential to the sphere surfaces.

The splayant micro- or nanoparticles used in the present invention may be made by combining at least two basic components: at least one stabilizing agent such as a surfactant or a dispersant, as defined in McCutcheon's Volume 1: Emulsifiers and Detergents, 1995, North American Edition (Manufacturing Confectioner Publishing Company, 1995) and at least one polymer. In one embodiment, the polymer may, in fact comprise a polymeric monomer.

Any polymer that may be stabilized by certain stabilizing agents may be used to form the particle in present invention. These polymers include but are not limited to the following: aliphatic or aromatic polyesters, aliphatic or aromatic polyamides, polyimides, polyurethanes, polyethers, polycarbonates, polyolefins, poly(methylmethacrylate), poly(styrene), poly(p-methylstyrene), poly(t-butylacrylamide), poly(styrene-co-methylmethacrylate), poly(styrene-co-t-butylacrylamide), poly(methyl-methacrylate-co-t-butylacrylamide), and homopolymers derived from p-cyanophenyl methacrylate, pentachlorophenyl acrylate, methacrylonitrile, isobornyl methacrylate, phenyl methacrylate, acrylonitrile, isobornyl acrylate, p-cyanophenyl acrylate, 2-chloroethyl acrylate, 2-chloroethyl methacrylate, 2-naphthyl acrylate, n-isopropyl acrylamide, 1-fluoromethyl methacrylate, isopropyl methacrylate, and 2-hydroxypropyl methacrylate. In a preferred embodiment of the invention, the polymeric material comprises particles of poly(methyl-methacrylate), polystyrene, poly(p-methylstyrene), poly(t-butylacrylamide) or poly(styrene-co-methylmethacrylate). In a preferred embodiment, the polymer may comprise polyester. In another preferred embodiment, the polymer may comprise a vinyl polymer. In another preferred embodiment, the polymer may comprise a polyolefin. Preferred polymers may also include polymers made from chain polymerization or from step polymerization.

Illustrative of useful thermoplastic resins are polylactones such as poly(pivalolactone), poly(caprolactone) and the like, polyurethanes derived from reaction of diisocyanates such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'diphenylmethane diisocyanate, 3,3-'dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, tolidine diisocyanate, hexamethylene diisocyanate, 4,4'-diisocyanatodiphenylmethane and the like, and linear long-chain diols such as poly(tetramethylene adipate), poly(ethylene adipate), poly(1,4-butylene adipate), poly(ethylene succinate), poly(2,3-butylenesuccinate), polyether diols and the like, polycarbonates such as poly(methane bis(4-phenyl) carbonate), poly(1,1-ether bis(4-phenyl) carbonate), poly(diphenylmethane bis(4-phenyl)carbonate), poly(1,1-cyclohexane bis(4-phenyl)carbonate), poly(2,2-bis-(4-hydroxyphenyl) propane) carbonate, and the like, polysulfones, polyether ether ketones, polyamides such as poly (4-amino butyric acid), poly(hexamethylene adipamide), poly(6-aminohexanoic acid), poly(m-xylylene adipamide), poly(p-xylyene sebacamide), poly(2,2,2-trimethyl hexamethylene terephthalamide), poly(metaphenylene isophthalamide) (Nomex®), poly(p-phenylene terephthalamide)(Kevlar®), and the like, polyesters such as poly(ethylene azelate), poly(ethylene-1,5-naphthalate), poly(ethylene-2,6-naphthalate), poly(1,4-cyclohexane dimethylene terephthalate), poly (ethylene oxybenzoate) (A-Tell®), poly(para-hydroxy benzoate) (Ekonol®), poly(1,4-cyclohexylidene dimethylene terephthalate) (Kodel®) (cis), poly(1,4-cyclohexylidene dimethylene terephthalate) (Kodel®) (trans), polyethylene terephthlate, polybutylene terephthalate and the like, poly (arylene oxides) such as poly(2,6-dimethyl-1,4-phenylene oxide), poly(2,6-diphenyl-1,4-phenylene oxide) and the like, poly(arylene sulfides) such as poly(phenylene sulfide) and the like, polyetherimides, vinyl polymers and their copolymers such as poly(vinyl acetate), poly(vinyl alcohol), poly (vinyl chloride), poly(vinyl butyral), poly(vinylidene chloride), ethylene-vinyl acetate copolymers, and the like, polyacrylics, polyacrylate and their copolymers such as poly(ethyl acrylate), poly(n-butyl acrylate), poly(methylmethacrylate), poly(ethyl methacrylate), poly(n-butyl methacrylate), poly(n-propyl methacrylate), poly(acrylamide), polyacrylonitrile, poly(acrylic acid), ethylene-acrylic acid copolymers, ethylene-vinyl alcohol copolymers acrylonitrile copolymers, methyl methacrylate-styrene copolymers, ethylene-ethyl acrylate copolymers, methacrylated budadiene-styrene copolymers and the like, polyolefins such as (linear) low and high density poly(ethylene), poly(propylene), chlorinated low density poly(ethylene), poly(4-methyl-1-pentene), poly(ethylene), poly(styrene), and the like, ionomers, poly(epichlorohydrins), poly(urethane) such as the polymerization product of diols such as glycerin, trimethylol-propane, 1,2,6-hexanetriol, sorbitol, pentaerythritol, polyether polyols, polyester polyols and the like with a polyisocyanate such as 2,4-tolylene diisocyanate, 2,6-tolylene diisocyante, 4,4'-diphenylmethane diisocyanate, 1,6-hexamethylene diisocyanate, 4,4'-dicycohexylmethane diisocyanate and the like, and polysulfones such as the reaction product of the sodium salt of 2,2-bis(4-hydroxyphenyl) propane and 4,4'-dichlorodiphenyl sulfone, furan resins such as poly(furan), cellulose ester plastics such as cellulose acetate, cellulose acetate butyrate, cellulose propionate and the like, silicones such as poly(dimethyl siloxane), poly(dimethyl siloxane), poly(dimethyl siloxane co-phenylmethyl siloxane), and the like, protein plastics, polyethers, polyimides, polyvinylidene halides, polycarbonates, polyphenylenesulfides, polytetrafluoroethylene, polyacetals, polysulfonates, polyester ionomers, polyolefin ionomers. Copolymers and/or mixtures of these aforementioned polymers may also be used.

Vulcanizable and thermoplastic rubbers useful in the practice of this invention may also vary widely. Illustrative of such rubbers are brominated butyl rubber, chlorinated butyl rubber, polyurethane elastomers, fluoroelastomers, polyester elastomers, butadiene/acrylonitrile elastomers, silicone elastomers, poly(butadiene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly (sulfide) elastomers, block copolymers, made up of segments of glassy or crystalline blocks such as poly(styrene), poly(vinyl-toluene), poly(t-butyl styrene), polyester and the like and the elastomeric blocks such as poly(butadiene), poly(isoprene), ethylene-propylene copolymers, ethylene-butylene copolymers, polyether ester and the like as for example the copolymers in poly(styrene)-poly(butadiene)-poly(styrene) block copolymer manufactured by Shell Chemical Company under the trade name of Kraton®. Copolymers and/or mixtures of these aforementioned polymers may also be used. Preferred matrix polymers for the present invention are thermoplastic polymers such as polyamides, polyesters, and polymers of alpha-beta unsaturated monomers and copolymers.

Polyamides, which may be used in the present invention, are synthetic linear polycarbonamides characterized by the presence of recurring carbonamide groups as an integral part of the polymer chain, which are separated from one another by at least two carbon atoms. Polyamides of this type include polymers, generally known in the art as nylons, obtained from diamines and dibasic acids having the recurring unit represented by the general formula:

—NHCOR¹COHNR²— in which $R^1$ is an alkylene group of at least 2 carbon atoms, preferably from about 2 to about 11 or arylene having at least about 6 carbon atoms, preferably about 6 to about 17 carbon atoms, and $R^2$ is selected from $R^1$ and aryl groups. Also, included are copolyamides and terpolyamides obtained by known methods, for example, by condensation of hexamethylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6), poly(hexamethylene sebacamide) (nylon 6, 10), poly(hexamethylene isophthalamide), poly(hexamethylene terephthalamide), poly(heptamethylene pimelamide) (nylon 7,7), poly(octamethylene suberamide) (nylon 8,8), poly(nonamethylene azelamide) (nylon 9,9), poly(decamethylene azelamide) (nylon 10,9), poly(decamethylene sebacamide) (nylon 10,10), poly(bis(4-amino cyclohexyl)methane-1,10-decane-carboxamide)), poly(m-xylylene adipamide), poly(p-xylene sebacamide), poly(2,2,2-trimethyl hexamethylene terephthalamide), poly(piperazine sebacamide), poly(p-phenylene terephthalamide), poly(metaphenylene isophthalamide) and the like.

Other useful polyamides are those formed by the polymerization of amino acids and derivatives thereof as, for example, lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-amino-decanoic acid) (nylon 10), poly(11-aminoundecanoic acid) (nylon 11), poly(12-aminododecanoic acid) (nylon 12) and the like.

Preferred polyamides for use in the practice of forming particles for use in this invention include poly(caprolactam), poly(12-aminododecanoic acid), poly(hexamethylene adipamide), poly(m-xylylene adipamide), and poly(6-aminohexanoic acid) and copolymers and/or mixtures thereof, for their widespread application and effectiveness in the present invention.

Other polymers, which may be employed in the practice of this invention, are linear polyesters. The type of polyester is not critical and the particular polyesters chosen for use in any particular situation will depend essentially on the physical properties and features, i.e., tensile strength, modulus and the like, desired in the final form. Thus, a multiplicity of linear thermoplastic polyesters having wide variations in physical properties are suitable for use in this invention.

The particular polyester chosen for use may be a homopolyester or a co-polyester, or mixtures thereof as desired. Polyesters are normally prepared by the condensation of an organic dicarboxylic acid and organic diols. Illustrative examples of useful polyesters will be described herein below in terms of these diol and dicarboxylic acid precursors.

Polyesters which are suitable for use in this invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters. Exemplary of useful cycloaliphatic, aliphatic and aromatic polyesters which may be utilized in the practice of this invention are poly(ethylene terephthalate), poly(cyclohexlenedimethylene) terephthalate, poly(ethylene dodecate), poly(butylene terephthalate), poly(ethylene naphthalate), poly(ethylene(2,7-naphthalate)), poly(methaphenylene isophthalate), poly(glycolic acid), poly(ethylene succinate), poly(ethylene adipate), poly(ethylene sebacate), poly(decamethylene azelate), poly(ethylene sebacate), poly(decamethylene adipate), poly(decamethylene sebacate), poly(dimethylpropiolactone), poly(para-hydroxybenzoate) (Ekonol®), poly(ethylene oxybenzoate) (A-tell®), poly(ethylene isophthalate), poly(tetramethylene terephthalate, poly(hexamethylene terephthalate), poly(decamethylene terephthalate), poly(1,4-cyclohexane dimethylene terephthalate) (trans), poly(ethylene 1,5-naphthalate), poly(ethylene 2,6-naphthalate), poly(1,4-cyclohexylene dimethylene terephthalate), (Kodel®) (cis), and poly(1,4-cyclohexylene dimethylene terephthalate (Kodel®) (trans).

Polyester compounds prepared from the condensation of a diol and an aromatic dicarboxylic acid are preferred for use in this invention. Illustrative of such useful aromatic carboxylic acids are terephthalic acid, isophthalic acid, o-phthalic acid, 1,3-napthalenedicarboxylic acid, 1,4 napthalenedicarboxylic acid, 2,6-napthalenedicarboxylic acid, 2,7-napthalenedicarboxylic acid, 4,4'-diphenyldicarboxylic acid, 4,4'-diphenylsulfphone-dicarboxylic acid, 1,1,3-trimethyl-5-carboxy-3-(p-carboxyphenyl)-idane, diphenyl ether 4,4'-dicarboxylic acid, bis-p(carboxy-phenyl) methane and the like. Of the aforementioned aromatic dicarboxylic acids, those based on a benzene ring (such as terephthalic acid, isophthalic acid, orthophthalic acid) are preferred for use in the practice of this invention. Of these preferred acid precursors, terephthalic acid is a particularly preferred acid precursor because it leads to polyesters that are less prone to degradation during melt processing and more dimensionally stable.

Preferred polyesters for use in the practice of this invention include poly(ethylene terephthalate), poly(butylene terephthalate), poly(1,4-cyclohexylene dimethylene terephthalate) and poly(ethylene naphthalate) and copolymers and/or mixtures thereof. Among these polyesters of choice, poly(ethylene terephthalate) is most preferred, because of its excellent mechanical strength, manufacturability, and effectiveness in the present invention.

Another set of useful thermoplastic polymers are formed by polymerization of alpha-beta-unsaturated monomers of the formula:

$R^3R^4C=CH_2$ wherein: $R^3$ and $R^4$ are the same or different and are cyano, phenyl, carboxy, alkylester, halo, alkyl, alkyl substituted with one or more chloro or fluoro, or hydrogen. Illustrative of such preferred polymers are polymers of ethylene, propylene, hexene, butene, octene, vinylalcohol, acrylonitrile, vinylidene halide, salts of acrylic acid, salts of methacrylic acid, tetrafluoroethylene, chlorotrifluoroethylene, vinyl chloride, styrene and the like. Copolymers and/or mixtures of these aforementioned polymers may also be used in the present invention.

Preferred thermoplastic polymers formed by polymerization of alpha-beta-unsaturated monomers for use in the practice of this invention are poly(propylene), poly(ethylene), poly(styrene) and copolymers and/or mixtures thereof, with poly(propylene) polymers and copolymers being most preferred for their low cost and good mechanical and surface properties.

Another set of synthetic polymers useful as polymers for the present invention includes thermoset polymer materials such as polyesters, unsaturated polyesters, alkyds, phenolic polymers, amino plastics, epoxy resins, polyurethanes, and polysulfides.

The polymer used to form the particle for use in the present invention may comprise a polymeric monomer. In a preferred embodiment, the monomer is a vinyl monomer. Preferred vinyl monomers may include methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate, acrylonitrile, methacrylonitrile, vinyl acetate, vinyl propionate, vinylidene chloride, vinyl chloride, styrene, t-butyl styrene, vinyl toluene, butadiene, fluorine-containing vinyls, isoprene, N,N-dimethyl acrylamide, acrylic acid, methacrylic acid, chloromethacrylic acid, maleic acid, allylamine, N,N-diethylallyamine, vinyl sulfonamide, sodium acrylate, sodium methacrylate, ammonium methacrylate, ammonium acrylate, acrylamidopropane-triethylammonium chloride, methacrylamidopropane-triethylammonium chloride, vinyl-pyridine hydrochloride, sodium vinyl phosphonate, sodium 1-methylvinylphosphonate, sodium vinyl sulfonate, sodium 1-methylvinyl-sulfonate, and sodium styrenesulfonate.

The monomer may also comprise a functional monomer. In a preferred embodiment, the functional monomer comprises a monomer containing at least one member selected from the group consisting of monom-COOH, multi-COOH, —COOH salts, NH2, anhydride, epoxy, acid chloride, sulfonic acid, sulfonic acid salts, and OH.

Any charged or non-charged stabilizing agent may be used in the formation of the particle for use in the present invention. The example of these charged or non-charged stabilizing agents include but not limited to carboxylic, sulfonate, or polyethylene oxide. The stabilizing agent may include a surfactant, which may be a negatively charged surfactant, a positively charged surfactant, or a surfactant having no charge. In one embodiment, the surfactant may be a monomer. Useful ionic compounds are cationic surfactants including onium species such as ammonium (primary, secondary, tertiary, and quaternary), phosphonium, or sulfonium derivatives of aliphatic, aromatic or arylaliphatic amines, phosphines and sulfides. Typically onium ions may cause intercalation in the layers through ion exchange with the metal cations of the preferred smectite clay.

The splayant micro- or nanoparticles used in the present invention may also include an initiator. The initiator may be an azo initiator, a peroxide initiator, a redox initiator, and the like. In one embodiment, the initiator may be a monomer. The use of the initiator may enhance polymerization. A possible benefit is that one could possibly get enhanced exfoliation or splaying of the clay, since the enhanced polymerization could result in particular variations, such as size, and molecular weight, which could cause more expansion between the clay platelets.

The layered materials most suitable for this invention include materials in the shape of plates with significantly high aspect ratio. However, other shapes with high aspect ratio will also be advantageous. The layered materials suitable for this invention comprise clays or non-clays. These materials include phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials include illite, mixed layered illite/smectite minerals, such as ledikite and admixtures of illites with the layered materials named above. Other useful layered materials, particularly useful with anionic matrix polymers, are the layered double hydroxide clays or hydrotalcites, such as $Mg_6Al_{3\ 4}(OH)_{18\ 8}(CO_3)_{17}H_2O$, which have positively charged layers and exchangeable anions in the interlayer spaces. Other layered materials having little or no charge on the layers may be useful provided they may be splayed with swelling agents, which expand their interlayer spacing. Such materials include chlorides such as $FeCl_3$, $FeOCl$, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag doped $V_2O_5$, $W_{0.2}V_{2.8}O7$, $Cr_3O_8$, $MoO_3(OH)_2$, $VOPO_4\text{-}2H_2O$, $CaPO_4CH_3\text{-}H_2O$, $MnHAsO_4\text{-}H_2O$, $Ag_6Mo_{10}O_{33}$ and the like. Preferred layered materials are swellable so that other agents, usually organic ions or molecules, may intercalate and/or exfoliate the layered material resulting in a desirable dispersion of the inorganic phase. These swellable layered materials include phyllosilicates of the 2:1 type, as defined in the literature (vide, for example, "An introduction to clay colloid chemistry," by H. van Olphen, John Wiley & Sons Publishers). Typical phyllosilicates with ion exchange capacity of 50 to 300 milliequivalents per 100 grams are preferred. Preferred layered materials for the present invention include clays, especially smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred layered materials include montmorillonite, hectorite and hydrotalcites, because of commercial availability of these materials.

The aforementioned layered materials may be natural or synthetic, for example, synthetic smectite layered materials. This distinction may influence the particle size and/or the level of associated impurities. Typically, synthetic layered materials are smaller in lateral dimension, and therefore possess smaller aspect ratio. However, synthetic layered materials are purer and are of narrower size distribution, compared to natural clays and may not require any further purification or separation. For this invention, the clay particles should have a lateral dimension of between 0.01 µm and 5 µm, and preferably between 0.05 µm and 2 µm, and more preferably between 0.1 µm and 1 µm. The thickness or the vertical dimension of the clay particles may vary between 0.5 nm and 10 nm, and preferably between 1 nm and 5 nm. The aspect ratio, which is the ratio of the largest and smallest dimension of the layered material particles should be >10:1 and preferably >100:1 and more preferably >1000:1 for this invention. The aforementioned limits regarding the size and shape of the particles are to ensure adequate improvements in some properties of the nanocomposites without deleteriously affecting others. For example, a large lateral dimension may result in an increase in the aspect ratio, a desirable criterion for improvement in mechanical and barrier properties. However, very large particles may cause optical defects, such as haze, and may be abrasive to processing, conveyance and finishing equipment as well as the imaging layers.

The clay used in this invention may be an organoclay. Organoclays are produced by interacting the unfunctionalized clay with suitable intercalants. These intercalants are typically organic compounds, which are neutral or ionic.

Useful neutral organic molecules include polar molecules such as amides, esters, lactams, nitriles, ureas, carbonates, phosphates, phosphonates, sulfates, sulfonates, nitro compounds, and the like.

Commercially available clays suitable for this invention include the Laponite®, Nanoclay®, Claytone®, and Permont® families of clays. For this invention Laponite®RDS is a preferred clay, a synthetic hectorite clay in the smectite family of clays. NaCloisite® is a preferred natural montmoillonite clay or Nanoclay, also in the smectite group.

The splayant particles used in the invention may be prepared by emulsion polymerization as described in "Emulsion Polymerization and Emulsion Polymers", edited by P. A. Lovell and M. S. El-Aassar, John Wiley and Sons, 1997. The splayant polymer particle may also be made by chain polymerization or step polymerization. The particle may be prepared by milling a polymer and a dispersant in a medium, wherein the polymer is not soluble in the medium. The particles made by milling or grinding of the solids particles with milling media. Particles may also be made by emulsifying insoluble polymers with surfactant/dispersant. The particle may also be prepared by emulsifying a solvent borne polymer with a dispersant in a medium wherein the polymer is not soluble in the medium, and removing the solvent.

The splayed material, preferably a nanocomposite, may be made by any method that may make a micro- or nanoparticle in water or organic solvent may be applied in present invention. In one suitable embodiment, the method for preparing a nanocomposite comprises the steps of preparing a particle with a diameter equal to or less than 3 micrometers, mixing the particle with a layered material dispersed in a medium, and splaying the layered material to produce a nanocomposite. Another suitable method for preparing a nanocomposite comprises the steps of preparing a particle with a diameter equal to or less than 3 micrometers by combining an emulsion polymerization monomer and a surfactant dispersible in a medium, wherein the monomer is not dispersible in the medium, mixing the particle with a layered material dispersed in the medium, and splaying the layered material to produce a nanocomposite. In another suitable embodiment, a nanocomposite may be prepared by milling, in a medium, a polymer and surfactant, which is dispersible in the medium, wherein the polymer is not dispersible in the medium, to form a particle with a diameter equal to or less than 3 micrometers and which is dispersed in the medium, mixing the particle with a layered material dispersible in the medium, and splaying the layered material to produce a nanocomposite. A further suitable embodiment comprises a method for preparing a nanocomposite comprising the steps of emulsifying a solvent borne polymer with a surfactant in a medium in which the polymer is not dispersible and removing the solvent to form a particle with a diameter equal to or less than 3 micrometers, mixing the particle with a layered material dispersible in the medium, and splaying the layered material to produce a nanocomposite.

The medium preferred for dispersing the particles and layered materials used to make the nanocomposites of the present invention may comprise an aqueous medium, an organic solvent, or a polymer, or mixtures thereof.

The splayed material of the present invention may find many uses alone, such as a coating element, an imaging element, a viscosity modifier, and the like. The splayed material of the present invention may also be combined with a matrix to form an article. In a preferred embodiment, the article comprises a matrix and a layered material splayed with a polymeric particle dispersed in a medium.

In a preferred embodiment, the matrix comprises at least one polymer. The matrix polymer may be any of the polymers previously described for use in forming the splayant particle herein above. The polymer may be any natural or synthetic polymer. The matrix polymer may also be any water soluble or insoluble polymer. The most preferred water soluble polymers preferred include gelatin, poly(vinyl alcohol), poly(ethylene oxide), polyvinylpyrolidinone, poly (acrylic acid), poly(styrene sulfonic acid), polyacrylamide, and quaternized polymers. The matrix polymer used may be the same as or different from the polymer used as the splayant polymer described above. Preferred matrix polymers may include polyester, polyolefin, polystyrene, or polyamide. The matrix polymer may be a thermoset polymer, such as unsaturated polyester, alkyd, phenolic, amino plastic, epoxy resin, polyurethane and polysulfide. In one preferred embodiment, matrix polymer may be polyethylene terephthalate.

The layered materials and the microparticles or nanoparticles of the invention may be interacted for intercalation/exfoliation by any suitable means known in the art of making nanocomposites. The order and the method of addition of layered material, microparticles or nanoparticles, and optional addenda may be varied.

The material of the instant invention comprising the layered materials, and the microparticles or nanoparticles together with any optional addenda, may be formed by any suitable method such as, extrusion, co-extrusion with or without orientation by uniaxial or biaxial, simultaneous or consecutive stretching, blow molding, injection molding, lamination, solvent casting, and the like.

The optional addenda mentioned herein above may include, but are not limited to, nucleating agents, fillers, plasticizers, impact modifiers, chain extenders, colorants, lubricants, antistatic agents, pigments such as titanium oxide, zinc oxide, talc, calcium carbonate, dispersants such as fatty amides, (e.g., stearamide), metallic salts of fatty acids, e.g., zinc stearate, magnesium stearate, dyes such as ultramarine blue, cobalt violet, antioxidants, fluorescent whiteners, ultraviolet absorbers, fire retardants, roughening agents, cross linking agents, voiding agents and the like. These optional addenda and their corresponding amounts may be chosen according to need.

The layered materials and the microparticles or nanoparticles of the invention may be further interacted with matrix polymers by any suitable means known in the art of making nanocomposites. The order and method of addition of layered material, microparticles or nanoparticles, matrix, and optional addenda may be varied.

In one embodiment, the layered materials may be initially mixed with a suitable microparticles or nanoparticles followed by mixing with a matrix. In another embodiment, the layered materials may simultaneously be mixed with a suitable microparticles or nanoparticles and a matrix. In another embodiment, the layered materials and microparticles or nanoparticles may be dispersed in suitable matrix monomers or oligomers, which are subsequently polymerized by step or chain polymerization. In still another embodiment, the layered material splayed by a microparticles or nanoparticles may be one of the monomers, which may participate in polymerization to form the composite with the matrix. In another embodiment, the layered materials may be melt blended with the microparticles or nanoparticles at temperatures preferably comparable to the polymer melting point or above, with or without shear, followed by mixing with a matrix at temperatures preferably comparable to the polymer and matrix melting points or above, with or without shear. In another embodiment, the layered materials may be melt blended with the microparticles or nanoparticles and matrix at temperatures preferably comparable to the polymer and matrix melting points or above, with or without shear. In another embodiment, the layered materials and the microparticles or nanoparticles may be combined in a solvent phase to achieve intercalation/exfoliation followed by mixing with a matrix. The resultant solution or dispersion may be used as is or with solvent removal through drying. The solvent may be aqueous or organic. The organic solvent may be polar or nonpolar. In yet another embodiment, the layered materials, the microparticles or nanoparticles, and the matrix may be combined in a solvent phase to achieve intercalation/exfoliation. The resultant solution or dispersion may be used as is or with solvent removal through drying. The solvent may be aqueous or organic. The organic solvent may be polar or nonpolar.

For the practice of the present invention, it is important to ensure compatibility between the matrix polymer and at least part of the microparticles or nanoparticles used for layered material intercalation or exfoliation. For the purposes of the present invention, compatibility refers to miscibility at the molecular level. If the matrix polymer comprises a blend of polymers, the polymers in the blend should be compatible with at least part of the microparticles or nanoparticles used for layered material splaying. If the matrix polymer comprises copolymer(s), the copolymer(s) should be compatible with at least part of the microparticles or nanoparticles used for layered material splaying.

The article of the instant invention comprising the layered materials, the microparticles or nanoparticles and the polymer matrix, together with any optional addenda, may be formed by any suitable method such as, extrusion, co-extrusion with or without orientation by uniaxial or biaxial, simultaneous or consecutive stretching, blow molding, injection molding, lamination, solvent casting, and the like.

In one suitable embodiment of the invention the layered material, together with any optional addenda, is melt blended with the microparticles or nanoparticles of the invention in a suitable twin screw compounder, to ensure proper mixing. An example of a twin screw compounder used for the experiments detailed below is a Leistritz Micro® 27. Twin screw extruders are built on a building block principle. Thus, the mixing of additives, the residence time of resin, as well as the point of addition of additives may be easily changed by changing the screw design, the barrel design and the processing parameters. Other compounding machines for use in preparing the present invention include, but are not limited to twin screw compounders manufactured by Werner and Pfleiderrer, and Berstorff. These compounders may be operated either in the co-rotating or the counter-rotating mode.

The screws of the Leistritz compounder are 27 mm in diameter, and they have a functionary length of 40 diameters. The maximum number of barrel zones for this compounder is 10. The maximum screw rotation speed for this compounder is 500 rpm. This twin screw compounder is provided with main feeders through which resins are fed, while additives might be fed using one of the main feeders or using the two side stuffers. If the side stuffers are used to feed the additives, the screw design needs to be appropriately configured.

The preferred mode of addition of layered materials to the microparticles or nanoparticles is through the use of the side stuffer to ensure the splaying of the layered materials through proper viscous mixing and to ensure dispersion of the filler through the polymer matrix as well as to control the thermal history of the additives. In this mode, the microparticles or nanoparticles is fed using the main resin feeder, and is followed by the addition of layered materials through the downstream side stuffer or vice versa. Alternatively, the layered materials and microparticles or nanoparticles may be fed using the main feeders at the same location or the layered materials and microparticles or nanoparticles are premixed and fed through a single side stuffer. This method is particularly suitable if there is only one side stuffer port available, and if there are limitations on the screw design.

In addition to the compounders described above, the article of the present invention may be produced using any suitable mixing device such as a single screw compounder, blender, mixer, spatula, press, extruder, or molder.

The article of the invention may be of any size and form, a liquid such as a solution, dispersion, latex and the like, or a solid such as a sheet, rod, particulate, powder, fiber, wire, tube, woven, non-woven, support, layer in a multilayer structure, and the like. The article of the invention may be used for any purpose, as illustrated by packaging, woven or non-woven products, protective sheets or clothing, and medical implement.

In one preferred embodiment of the invention, the article of the invention comprises the base of an imaging member. Such imaging members include those utilizing photographic, electrophotographic, electrostatographic, photothermographic, migration, electrothermographic, dielectric recording, thermal dye transfer, inkjet and other types of imaging. In a more preferred embodiment of the invention, the article of the invention comprises the base of a photographic imaging member, particularly a photographic reflective print material, such as paper or other display product. In another preferred embodiment, the article may comprise a coating element.

Typical bases for imaging members comprise cellulose nitrate, cellulose acetate, poly(vinyl acetate), polystyrene, polyolefins, poly(ethylene terephthalate), poly(ethylene naphthalate), polycarbonate, polyamide, polyimide, glass, natural and synthetic paper, resin-coated paper, voided polymers, microvoided polymers, microporous materials, nanovoided polymers and nanoporous materials, fabric, and the like. The material of the invention comprising a matrix polymer and the splayed layered materials may be incorporated in any of these materials and/or their combination for use in the base of the appropriate imaging member. In case of a multilayered imaging member, the aforementioned material of the invention may be incorporated in any one or more layers, and may be placed anywhere in the imaging support, e.g., on the topside, or the bottom side, or both sides, and/or in between the two sides of the support. The method of incorporation may include extrusion, co-extrusion with or without stretching, blow molding, casting, co-casting, lamination, calendering, embossing, coating, spraying, molding, and the like. The image receiving layer or layers, as per the invention, may be placed on either side or both sides of the imaging support.

In one preferred embodiment, the imaging support of the invention comprising a matrix polymer and the splayed layered materials of the invention may be formed by extrusion and/or co-extrusion, followed by orientation, as in typical polyester based photographic film base formation. Alternatively, a composition comprising a matrix polymer and the splayed layered materials of the invention may be extrusion coated onto another support, as in typical resin coating operation for photographic paper. In another embodiment, a composition comprising a matrix polymer and the splayed layered materials of the invention may be extruded or co-extruded and preferably oriented into a preformed sheet and subsequently laminated to another support, as in the formation of typical laminated reflective print media.

In another embodiment, the material of this invention may be incorporated in imaging supports used for image display such as reflective print media including papers, particularly resin-coated papers, voided polymers, and combinations thereof. Alternatively, the imaging support may comprise a combination of a reflective medium and a transparent medium, in order to realize special effects, such as day and night display. In a preferred embodiment, at least one layer comprising the material of the present invention is incorporated in a paper support, because of its widespread use. In another preferred embodiment, at least one layer comprising the nanocomposite of the present invention may be incorporated into an imaging support comprising a voided polymer, because of its many desirable properties such as tear resistance, smoothness, improved reflectivity, metallic sheen, and day and night display usage.

The imaging supports of the invention may comprise any number of auxiliary layers. Such auxiliary layers may include antistatic layers, back mark retention layers, tie layers or adhesion promoting layers, abrasion resistant layers, conveyance layers, barrier layers, splice providing layers, UV absorption layers, antihalation layers, optical effect providing layers, waterproofing layers, and the like.

The article of the present invention may be used in non-imaging applications as well. For example, the article may comprise a viscosity modifier, adhesives, engineering resins, lubricants, polymer blend component, biomaterial, water treatment additives, cosmetics component, antistatic agent, food and beverage packaging material, semi-conductor, super conductor, or releasing compound agent in pharmaceuticals applications.

EXAMPLES

The following examples illustrate the practice of this invention. They are not intended to be exhaustive of all possible variations of the invention. Parts and percentages are by weight unless otherwise indicated.

The micro- and nano-particles used were:

TABLE 1

| Polymer ID | Particle size (μm) |
|---|---|
| P1 (PSHb/Barquat) | 0.0272 |
| P2 (PSHbEd10G) | 0.0155 |
| P3 (PS-E/A-246L) | 0.0264 |
| P4 (PSHb/10G) | 0.065 |
| P5 (PS/Barquat) | 0.0209 |
| P6 (PS/A-246L) | 0.019 |
| P7 | 2 |
| P8 | 0.537 |
| P9 | 0.527 |

Preparation of Polymer Particle 1 via Emulsion Polymerization

The polymer particles were prepared by emulsion polymerization technique. Deionized water (80 g) and Barquat (50%) (3.0 g) were first charged to a 1L 3-neck flask equipped with a nitrogen inlet, mechanical stirrer and condenser. The flask was immersed in a constant temperature bath at 60° C. and purged with nitrogen for 20 min. Potassium persulfate (0.35 g) was added and followed by the addition of monomer emulsion containing styrene (56 g), hydroxyl acrylate (4 g), potassium persulfate (0.35 g), Barquat (50%) (3.0 g) and Deionized water (60 g) (C). The mixture was agitated continuously during the feeding of monomer emulsion. The addition time of the monomer emulsion was two hours. The polymerization was continued for 30 min after the addition of the first monomear emulsion was complete. The mixture was cooled to room temperature and filtered.

Preparation of Polymer Particles 2-6 via Emulsion Polymerization

The polymer particles P2-P6 are synthesized similarly to particle 1 above, except P2 used Olin 10 G as surfactant and also incorporated ethylene glycol dimethacrylate as crosslinker, P3 used Rhodapol A-246L as surfactant and replaced Hb with MAA, P4 used Olin 10 G as surfactant, P5 used styrene only, and P6 used Rhodapol A-246L as surfactant and used styrene only.

Preparation of Polymer Particles P7 via Emulsification Process

Polystyrene was prepared by solution polymerization in toluene with 20% solids. Deionized water (1000 g) and surfactant Triton 770 (30%) 5.3 g were mixed well. 200 g polystyrene solution was slowly added to the aqueous solution while mixing vigorously at room temperature. The resulting mixture was homogenized to form droplets with strong agitation. Rotor vapor was used to remove volatile solvents at 52 C under vacuum.

Preparation of Polymer Particles P8 and P9 via Milling/Grounding Process

The polymer particles were prepared by mill grind. Polymeric milling media beads (30 g) with a mean diameter of 50 micrometers, Polystyrene (powder) (30 g), Triton 770 (30%), 10.5 g sodium salt, and Deionized water (209.5 g) were milled in a 2 liter double walled vessel obtained from BYK-Gardner using a high energy media mill manufactured by Morehouse-Cowles Hochmeyer. The mill was run for approximately 8 hours at room temperature. The dispersion was separated from the milling media by filtering the mill grind through a 4-8 μm KIMAX® Buchner Funnel obtained from VWR Scientific Products.

The layered materials uses were:

TABLE 2

| Layered Material ID | Name | Supplier | (001) Basal Plane Interplanar Spacing (Å) |
|---|---|---|---|
| L1 | NaCloisite ® | Southern Clay Products | 13 |
| L2 | Laponite ® RDS | Southern Clay Products | 13 |

The methods of characterization used included:

The (001) basal plane spacing was determined by X-ray diffraction using a Rigaku Bragg-Brentano diffractometer in reflection mode geometry utilizing a monochromator tuned to CuKα radiation. All measurements were performed in ambient air.

Further assessment of the layered material morphology was performed by transmission electron microscopy (TEM) using a microscope operating at 200 kV accelerating voltage (JEM-2000FX from JEOL, Inc.). The following examples highlight the observation of the splaying of layered materials using particles, preferably polymer particles.

Example 1-3

Na Cloisite® Splayed with P1

Na Cloisite® was mixed with P1 solution in water at room temperature for 18 hrs. A few drops from each mixture was deposited onto individual glass slides and allowed to dry in ambient air. The structures of the resultant solid films, formed on the glass sample holders, were investigated by XRD. The results from XRD analysis are shown in Table 3.

TABLE 3

| Example | P1/L1 | Spacing (*) |
|---|---|---|
| 1 | 95/5 | 32, 19[1] |
| 2 | 50/50 | 17 |
| 3 | 25/75 | 14 |

[1]In some samples, two intercalated phases were detected, possibly due to non uniform mixing, or heating of a region of the sample for too long (bottom of a container), resulting in some degradation of the intercalant.

Compared to the (001) basal plane spacing reported for layered material L1 (Table 2), examples 1-3 show evidence of an increase in basal plane spacing, indicating splaying, such as intercalation and/or exfoliation, has occurred. These results were confirmed by TEM.

Example 4-6

Na Cloisite® Splayed with P2

Clay Na Cloisite®, was mixed with polymer colloid solution in water at room temperature for 24 hrs. A few drops from each mixture was deposited onto a separate individual glass slide and allowed to dry in ambient air. The structures of the resultant solid films, formed on the glass sample holders, were investigated by XRD. The results from XRD analysis are shown in Table 4.

TABLE 4

| Example | P2/L1 | Spacing (*) |
|---|---|---|
| 4 | 95/5 | 19 |
| 5 | 50/50 | 17 |
| 6 | 25/75 | 14 |

Compared to the (001) basal plane spacing reported for layered material L1 (Table 2), examples 4-6 show evidence of an increase in basal plane spacing, indicating splaying, such as intercalation and/or exfoliation, has occurred. These results were confirmed by TEM.

Example 7-14

Clay Splayed with Polymer 5 parts of Na Cloisite® or Laponite® was mixed with 95 parts of polymer particles dispersed in water at room temperature for 18 hrs. A few drops from each mixture was deposited onto a separate individual glass slide and allowed to dry in ambient air. The structures of the resultant solid films, formed on the glass sample holders, were investigated by XRD. The results from XRD analysis are shown in Table 5.

TABLE 5

| Example | P | L | Spacing (*) |
|---|---|---|---|
| 7 | P3 | L2 | No peak observed |
| 8 | P4 | L2 | No peak observed |
| 9 | P1 | L2 | 19.3, splayed |
| 10 | P4 | L1 | 19.3, splayed |
| 11 | P3 | L1 | Splayed |
| 12 | P2 | L2 | Splayed |
| 13 | P5 | L1 | 32, 18[1] |
| 14 | P6 | L1 | 35 |

[1]In some samples, two intercalated phases were detected, possibly due to non uniform mixing, or heating of a region of the sample for too long (bottom of a container), resulting in some degradation of the intercalant.

Compared to the (001) basal plane spacing reported for layered material L1 (Table 2), examples 7-14 show evidence of an increase in basal plane spacing, indicating splaying, such as intercalation and/or exfoliation, has occurred. FIG. 1 illustrates the absence of a (001) basal plane X-ray diffraction peak for example 8. When completely splayed (exfoliated), as in example 8, the layered material layers are pushed so far apart that they are seen as a collection of slivers of layered material platelets, each corresponding to an individual layer of the materials, and each with no apparent interaction with any neighboring layered material. When measuring the spacing of an exfoliated material, no peak is observed.

Figure 2:
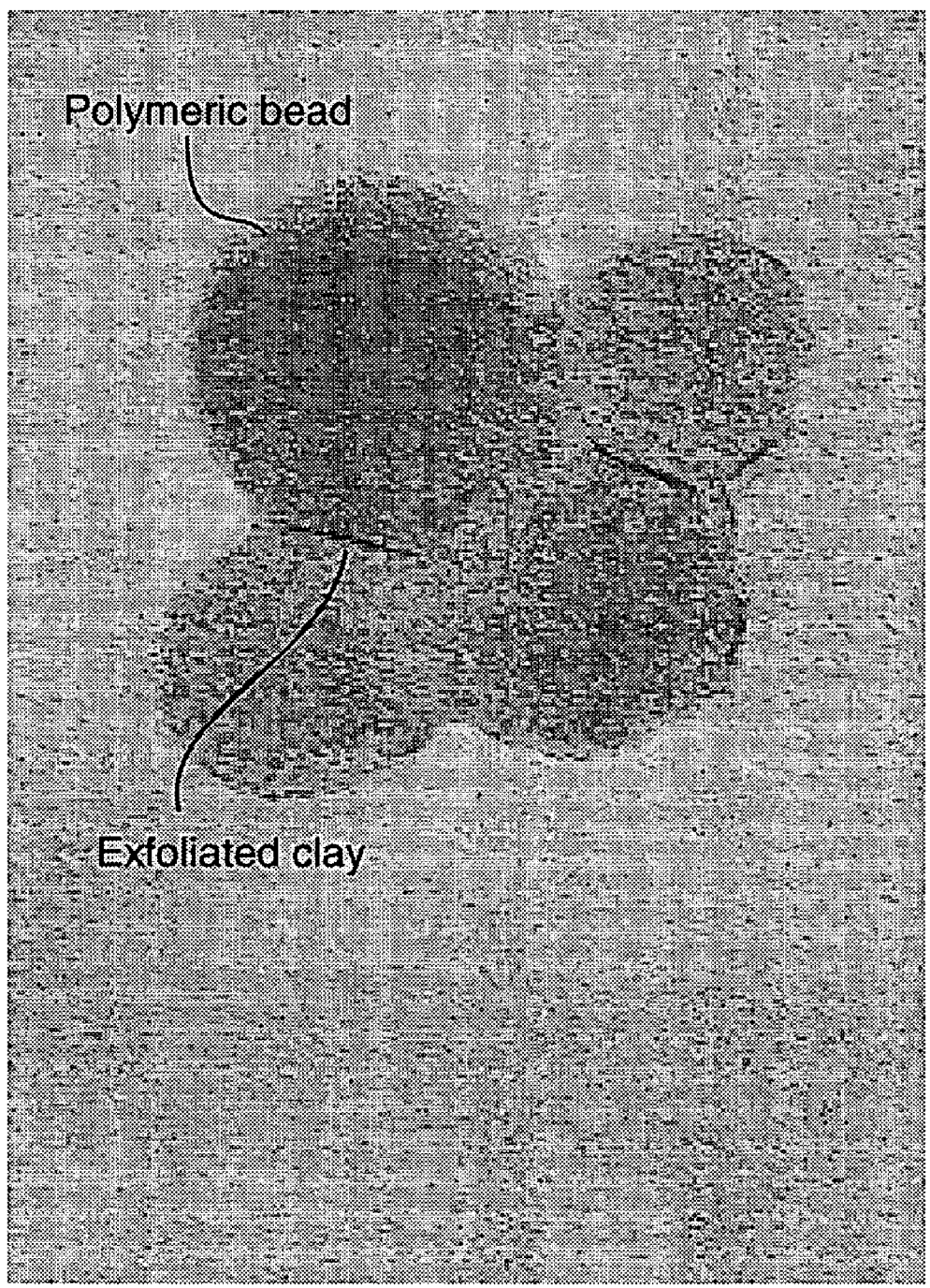
FIG. 2 illustrates a TEM image for P4:L2 at a ratio of 95:5, as in Example 8.

FIG. 2, a TEM plot of Example 8, shows that the Laponite clay has exfoliated to individual platelets, consistent with the XRD pattern for the same material shown in FIG. 1.

It is further noted that exfoliated clay platelets may interact with the polymer in a specific way. The polymer itself may take on a spherical, bead-like morphology, with diameters ranging from ~30-80 nm. The exfoliated Laponite clay platelets may be found to adhere either on the polymer bead surfaces, or be sandwiched between beads, FIG. 2.

Figure 3:
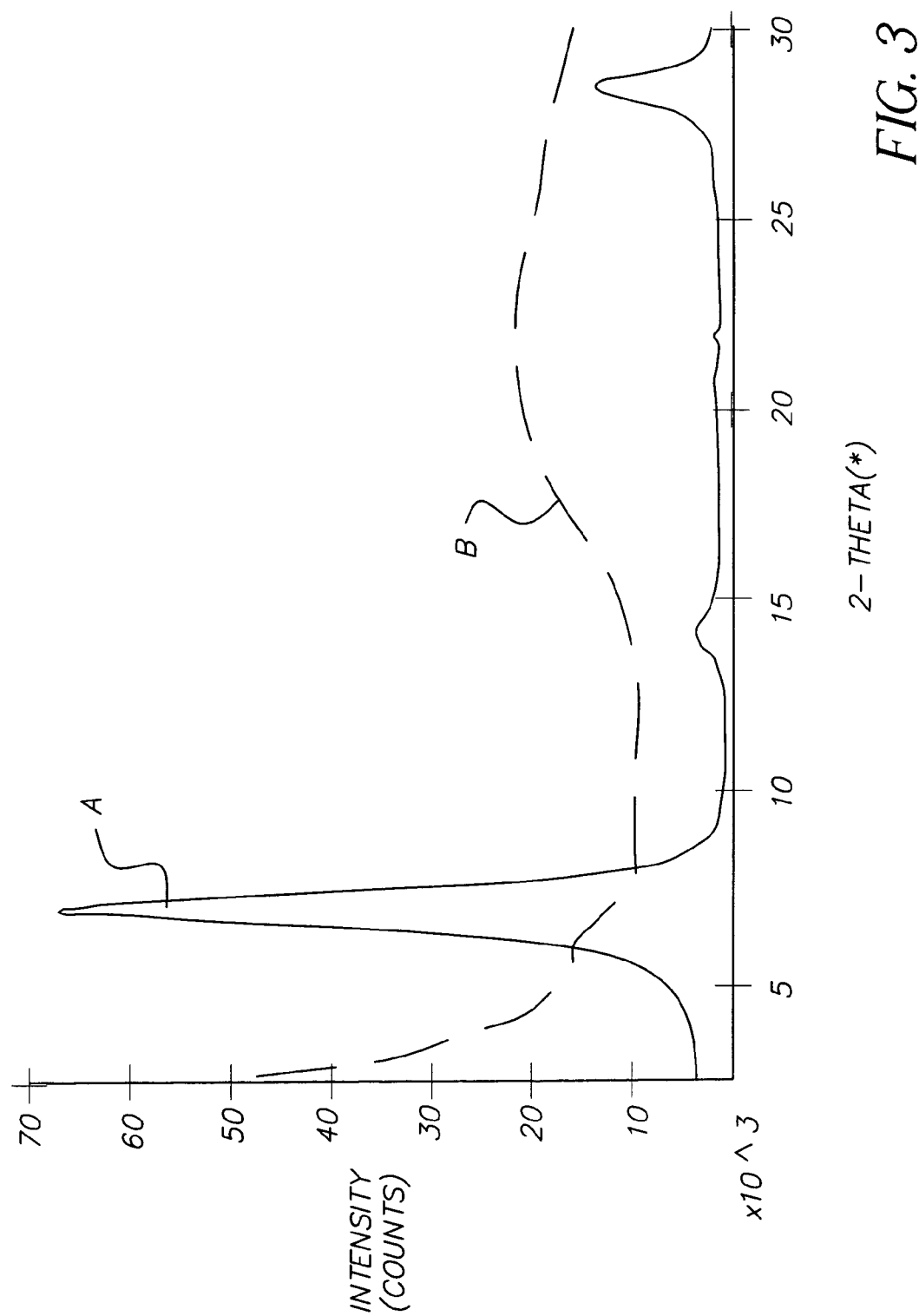
FIG. 3 illustrates XRD patterns for (A) L1 and (B) P3:L1 at a ratio of 95:5, as in Example 11.

FIG. 3 demonstrates the effect of P3 on L1. L1 without polymer gives a (001) basal plane X-ray diffraction peak, FIG. 3A, with a spacing of 13 Å. Mixing P3 with L1 results in substantial loss of the (001) basal plane X-ray diffraction peak, FIG. 3B, indicating that L1 is almost completely splayed (exfoliated). TEM data are in good agreement with the XRD pattern for the same material shown in FIG. 3B.

Examples 15-17

Clay Splayed with PET Particles 5 parts of Na Cloisite® were mixed with 95 parts of PET particles dispersed in water at room temperature for 18 hrs. A few drops from each mixture were deposited onto a separate individual glass slides and allowed to dry in ambient air. The structures of the resultant solid films, formed on the glass sample holders, were investigated by XRD. The results from XRD analysis are shown in Table 6.

TABLE 6

| Example | P | L | Spacing (*) |
|---|---|---|---|
| 15 | P8 | L1 | 27 |
| 16 | P9 | L1 | 22 |

Compared to the (001) basal plane spacing reported for layered material L1, examples 15-16 show evidence of an increase in basal plane spacing, indicating splaying, such as intercalation and/or exfoliation, has occurred.

Examples 17

Clay Splayed with Polymer Particles 4 parts of Na Cloisite® were mixed with 96 parts of polymer particles dispersed in water at room temperature for 18 hrs. A few drops from each mixture were deposited onto a separate individual glass slide and allowed to dry in ambient air. The structure of the resultant solid film, formed on the glass sample holders, was investigated by XRD. The results from XRD analysis are shown in Table 7.

TABLE 7

| Example | P  | L  | Spacing (*) |
|---------|----|----|-------------|
| 17      | P7 | L1 | 23          |

Compared to the (001) basal plane spacing reported for layered material L1, example 17 shows evidence of an increase in basal plane spacing, indicating splaying, such as intercalation and/or exfoliation, has occurred.

The invention has been described in detail with particular reference to certain preferred embodiments thereof, but it will be understood that variations and modifications may be effected within the spirit and scope of the invention.

What is claimed is:

1. A method for preparing a nanocomposite comprising the steps, in order, of preparing at least one spherical polymer bead, mixing said spherical polymer bead with a layered material dispersed in a medium, and splaying said layered material to produce a nanocomposite, wherein said spherical polymer bead has a diameter equal to or less than 3 micrometers and said layered material is adhered on the polymer bead surface or sandwiched between polymer beads with the long-direction of said splayed material tangential to said bead surfaces.

2. The method of claim 1 wherein said spherical polymer bead comprises a microparticle of between 0.5 and 3 micrometers in diameter.

3. The method of claim 1 wherein said spherical polymer bead comprises a nanoparticle less than 0.5 micrometers in diameter.

4. The method of claim 1 wherein said spherical polymer bead is prepared by emulsion polymerization.

5. The method of claim 4 wherein said bead is prepared by combining at least one monomer capable of emulsion polymerization and at least one surfactant.

6. The method of claim 5 wherein said monomer capable of emulsion polymerization is a vinyl monomer.

7. The method of claim 5 wherein said monomer capable of emulsion polymerization comprises a functional monomer.

8. The method of claim 5 further comprising an initiator.

9. The method of claim 1 wherein said spherical polymer bead is prepared by emulsifying a solvent borne-polymer with a dispersant in a medium wherein said polymer is not soluble in said medium, and removing the solvent.

10. The method of claim 9 wherein said polymer comprises at least one member selected from the group consisting of polyester, vinyl polymer, and polyolefin.

11. The method of claim 9 wherein said medium comprises an aqueous medium or an organic solvent.

12. The method of claim 1 wherein said layered material is a clay.

13. The method of claim 12 wherein said clay comprises smectite clay.

14. The method of claim 12 wherein said clay comprises layered double hydroxide clay.

15. The method of claim 1 wherein said splayed material is exfoliated.

16. The method of claim 1 wherein said splayed material is intercalated.

17. A method for preparing a nanocomposite comprising the steps, in order, of preparing a spherical polymer bead by combining an monomer capable of emulsion polymerization and a surfactant dispersible in a medium wherein said monomer is not dispersible in said medium, mixing said spherical polymer bead with a layered material dispersed in said medium, and splaying said layered material to produce a nanocomposite, wherein said spherical polymer bead has a diameter equal to or less than 3 micrometers, and wherein said layered material is adhered on the polymer bead surfaces with the long-direction of said splayed material tangential to said bead surfaces.

18. The method of claim 17 wherein said emulsion polymerization monomer is a vinyl monomer.

19. A method for preparing a nanocomposite comprising the steps of milling in a medium a polymer and surfactant dispersible in said medium, wherein said polymer is not dispersible in said medium, to form a bead dispersed in said medium, mixing said bead with a layered material dispersible in said medium, and splaying said layered material to produce a nanocomposite, wherein said bead comprises a diameter equal to or less than 3 micrometers.

20. A method for preparing a nanocomposite comprising the steps, in order, of emulsifying a solvent borne polymer with a surfactant in a medium in which said polymer is not dispersible and removing the solvent to form a spherical polymer bead, mixing said spherical polymer bead with a layered material dispersible in said medium, and splaying said layered material to produce a nanocomposite, wherein said spherical polymer bead has a diameter equal to or less than 3 micrometers, and wherein said layered material is adhered on the polymer bead surface with the long-direction of said splayed material tangential to said bead surfaces.

21. A method for preparing a nanocomposite comprising the steps of preparing a bead, mixing said bead with a layered material dispersed in a medium, and splaying said layered material to produce a nanocomposite, wherein said bead comprises a diameter equal to or less than 3 micrometers, wherein said bead is prepared by milling a polymer and a dispersant in a medium, wherein said polymer is not soluble in said medium.

22. The method of claim 21 wherein said polymer comprises at least one polymer made from chain polymerization.

23. The method of claim 21 wherein said polymer comprises at least one polymer made from step polymerization.

24. The method of claim 21 wherein said polymer comprises at least one member selected from the group consisting of polyester, vinyl polymer, and polyolefin.

25. The method of claim 21 wherein said medium comprises an aqueous medium or an organic solvent.

* * * * *